United States Patent [19]
Drake et al.

[11] Patent Number: 4,655,345
[45] Date of Patent: Apr. 7, 1987

[54] COMPACT DISC STORAGE UNIT

[76] Inventors: Craig D. Drake, 1622 Isett Ave.; Ross A. Jessen, 1566 Washington St., both of Muscatine, Iowa 52761

[21] Appl. No.: 797,911

[22] Filed: Nov. 14, 1985

[51] Int. Cl.$^4$ .............................................. A47B 81/06
[52] U.S. Cl. .................................... 206/309; 206/444; 312/10; 312/12
[58] Field of Search ............... 206/309, 444, 311, 387; 312/12, 10; 229/52 AL, 52 AC

[56] References Cited

U.S. PATENT DOCUMENTS

| | | | |
|---|---|---|---|
| 3,081,870 | 3/1963 | Plettner | 206/456 |
| 3,366,306 | 1/1968 | Kotowick | 229/52 AL |
| 3,603,478 | 9/1971 | Connan | 220/339 |
| 3,628,843 | 12/1971 | Wynne | 206/387 |
| 4,182,538 | 1/1980 | Armistedd | 206/387 |
| 4,241,955 | 12/1980 | Armistedd | 312/12 |
| 4,515,420 | 5/1985 | Grosch | 312/12 |

FOREIGN PATENT DOCUMENTS

| | | | |
|---|---|---|---|
| 85/01608 | 4/1985 | PCT Int'l Appl. | 206/387 |
| 614547 | 11/1979 | Switzerland | 206/387 |

Primary Examiner—William Price
Assistant Examiner—Brenda J. Ehrhardt

[57] ABSTRACT

A storage unit is provided for containing compact discs in a vertical orientation and allowing the user to easily load and unload the discs. The unit includes a housing with an open front, laterally spaced dividers which hold the discs in place, and adjustable members which facilitate loading and unloading of the discs. The storage unit is portable, and it includes a handle with which the user may carry the unit.

7 Claims, 5 Drawing Figures

U.S. Patent  Apr. 7, 1987  4,655,345
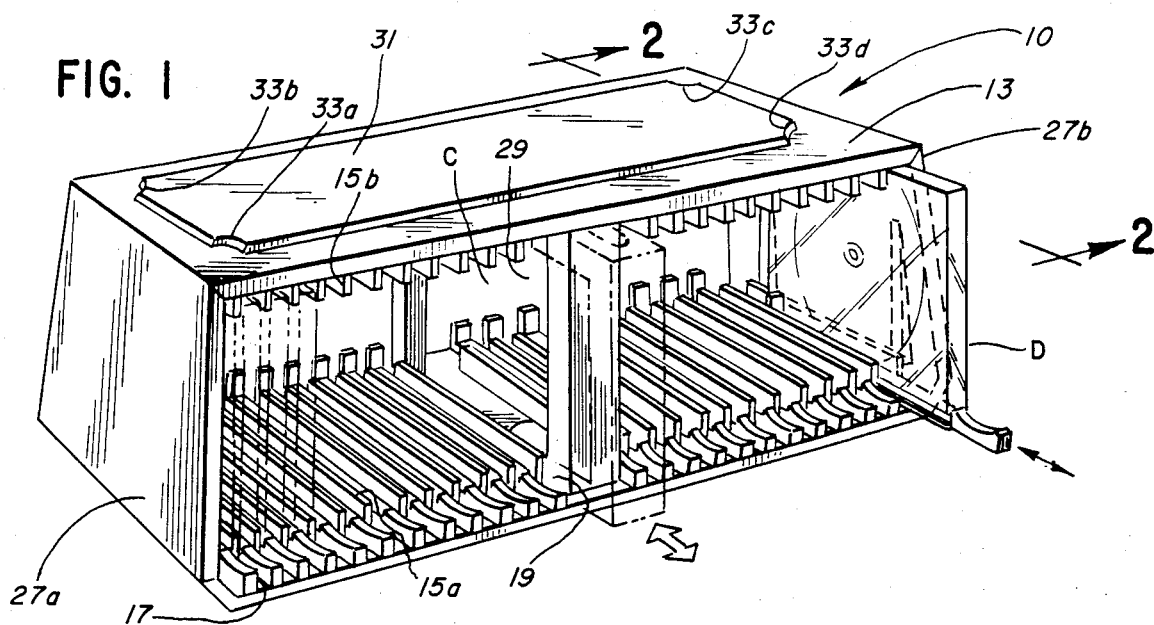
FIG. 1
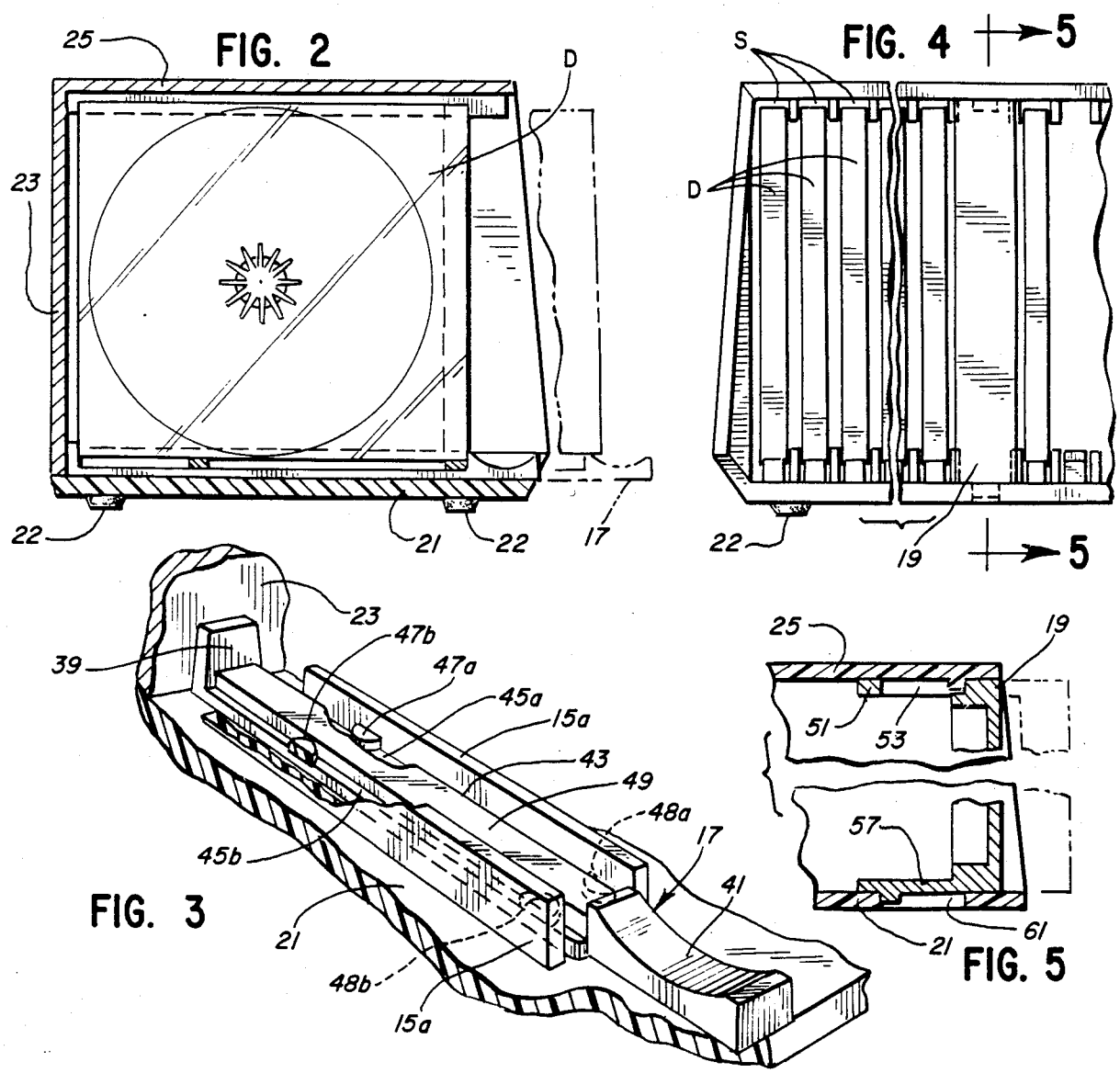
FIG. 2
FIG. 4
FIG. 3
FIG. 5

COMPACT DISC STORAGE UNIT

BACKGROUND OF THE INVENTION

1. Field of the Invention

The present invention generally relates to a storage unit and more specifically, to a storage unit for compact discs used in digital sound systems and other electronic systems.

2. Background of the Invention

In recent years electronic information systems have experienced tremendous commercial success and have found wide acceptance and application in almost every industry. One example of such systems is personal computers for home and office use. The computers process data and information which they receive; and they can store this data and information on electro-magnetic tapes or compact discs. Another example of such systems is digital sound units which process sound information pre-recorded on discs and reproduce the pre-recorded sounds.

The suppliers of compact discs typically market them in thin, planar cartridges having a rectangular shape and made out of plastic. As used below, the phrase "compact disc" includes the disc as well as the cartridge which houses it. The commercial success of the electronic information systems has resulted in the widespread use of compact discs and in the need for storage units for them.

The suppliers of compact discs recommend that the user store these discs with the plane of the disc vertically oriented. Thus, a storage unit for these discs should contain them in this manner. It should also provide individual storage of the discs and allow quick and easy insertion into and removal of the discs from the storage unit. In addition, the storage unit should display these discs so that the user can easily observe the various titles and select which he or she would like to remove from the storage unit. Preferably, the storage unit should be portable; and its structure should allow stacking of other similar units on top of it for added storage capacity.

The compact disc storage unit of the present invention provides a construction which fulfills all of the above-stated requirements. It accommodates a plurality of compact discs in an attractive yet orderly fashion. It provides effective containment of the discs, and it allows the user to quickly and easily load and unload them.

OBJECTS OF THE INVENTION

It is an object of this invention to provide an improved storage unit for standard compact discs.

It is a further object of the present invention to provide an improved disc storage unit which can house a plurality of discs with the plane of each disc vertically oriented.

It is another object of this invention to provide a storage unit with a construction which minimizes the expense of manufacture and provides secure and separate containment of compact discs.

It is yet another object of the present invention to provide a storage unit for compact discs which allows the user to quickly and easily load and unload the discs.

It is still another object of this invention to provide a storage unit which allows the user to observe the disc titles and select which disc he or she would like to remove from the storage unit.

It is still another object of the present invention to provide a storage unit which is portable and which a user may easily carry using one hand.

It is still another object of this invention to provide a storage unit which a user may arrange with other similar units to increase storage capacity.

Other objects, advantages and features of the present invention will become apparent upon reading the following detailed description and appended claims and upon reference to the accompanying drawings.

SUMMARY OF THE INVENTION

In accordance with one embodiment of this invention, a compact disc storage unit which achieves the foregoing objects includes a housing having an interior chamber with an opening through which the unit receives the compact discs. The opening also allows the user to view one edge face of each compact disc so that he or she may select any desired disc stored in the unit.

The unit includes a plurality of divider segments disposed in the chamber and secured to the housing in parallel spaced relation. The divider segments define slots which receive the discs and which serve as predetermined, parallel paths of movement for the discs as they move in and out of the housing. These slots also serve as seats for the discs.

The unit also includes independently adjustable means slidably secured to the housing for providing support for each disc and independent substantially horizontal relative movement of each disc between selected modes. In the first mode, the independently adjustable means allows the user to either remove a disc supported by the adjustable means or to place a disc on the adjustable means for insertion in the housing. In the second mode, the adjustable means supports a disc in place in the chamber of the housing.

To insert a disc into the storage unit, the holder places the adjustable means in the first mode, holds the disc in a vertical orientation and places the disc on the adjustable means. The user then advances the adjustable means into the chamber of the storage unit housing until the housing substantially conceals the disc within the chamber. To remove a disc from the storage unit, the user places the adjustable means in the second mode where a substantial portion of the disc projects outward through the opening of the storage unit housing. In this position, the user may grasp the disc and remove it from the storage unit.

BRIEF DESCRIPTION OF THE DRAWINGS

For a more complete understanding of this invention, one should refer to the embodiment illustrated in greater detail in the accompanying drawings and described below by way of an example of the invention. In the drawings:

FIG. 1 is a perspective front view of a preferred embodiment of the improved compact disc storage unit.

FIG. 2 is a sectional view taken along line 2—2 of FIG. 1.

FIG. 3 is an enlarged perspective view of one adjustable member of the storage unit.

FIG. 4 is a partial front elevational view of the storage unit.

FIG. 5 is a sectional view taken along line 5—5 of FIG. 4.

DETAILED DESCRIPTION OF THE DRAWINGS AND A PREFERRED EMBODIMENT

While the following provides a description of a preferred embodiment of the invention, it does not limit the present invention to that embodiment.

Turning now to the drawings, FIG. 1 shows the preferred embodiment of a compact disc storage unit at 10. The storage unit generally comprises a housing 13 defining a chamber C; upper and lower dividers 15a and 15b disposed in the chamber; adjustable members 17 slidably secured to the housing in the chamber C; and a handle 19. The storage unit is portable, and the user may carry it using the handle.

The housing 13 is an elongated enclosure made of suitable materials, such as wood or plastic. It includes a base 21 with rests 22 for engaging a supporting surface, a backwall 23, a cover 25, sidewalls 27a and 27b, and an open front 29. Through the opening 29, the housing receives the compact discs D in the chamber C. The walls, base, and cover of the housing 13 define the enclosure and the chamber C; however, they also serve a number of other functions. For example, the backwall 23 also serves as a stop for adjustable means 17, as described below.

Additionally, the cover 25 serves as a support base for a second storage unit. To maintain registry of a similar juxtaposed storage unit, the unit 10 has notches or recesses 33a, 33b, 33c, and 33d formed at its corners. Such recesses may be provided in various ways. In the embodiment 10 they are notches in the corner of a raised central portion 31. These notches or recesses receive the four rests of the second storage unit and lock the second unit in place on top of the first unit by preventing lateral movement of the second unit. Thus, a user may stack or nest a number of these storage units to increase the storage capacity available to him or her.

To provide seats for the compact discs and to retain these discs in the chamber C, the storage unit includes a plurality of elongate guiderails or dividers 15a secured to the base 21 or integrally molded with the base 21, and it includes corresponding guiderails or dividers 15b secured to cover 25 or integrally molded with the cover 25. The two sets of dividers 15a and 15b define parallel, spaced slots S oriented perpendicularly to the base 21 and the horizontal surface upon which the user usually places the storage unit. Thus, these laterally spaced, parallel, dividers, 15a and 15b, maintain the compact discs D in substantially vertical, face-to-face relation in the chamber C. They also provide paths of movement for the compact discs as the discs move in and out of the housing.

Referring now to FIG. 3, to facilitate easy loading and unloading of the discs D, the storage unit includes a plurality of adjustable members 17 slidably secured to base 21. The storage unit has a member 17 disposed at the bottom of each slot S in the space between the dividers 15a. These members 17 are elongate, and they include a stop 39 at one end and a finger grip 41 at the other end. The body portion 43 of these members extends between the stop 39 and the finger grip 41, and it is generally rectangular with ledges or step grooves 45a and 45b formed in opposite side edges to define a top surface having the shape of an inverted channel.

To slidably secure each member 17 to the base 21 of the housing, the storage unit includes catches 47a, 47b, 48a, and 48b for each slot S. These four catches are segments of dividers 15a which project transversely of the dividers into slot S. Catches 47a and 48a project from the face of one divider, and catches 47b and 48b from the face of another divider opposite the face of the first. The catches 47a and 48a extend into the ledge 45a and the catches 47b and 48b into the ledge 45b. These catches allow reciprocating movement of the member 17 transversely of the storage unit 10. However, they restrain the member 17 from lifting above the base 21.

Although the catches allow reciprocating movement of the member 17, they and the backwall 23 limit this movement. When the user slides the member 17 into the chamber C, the stop 39 engages the backwall 23 and stops further movement. In this position, the housing 13 fully encloses a disc supported by the member. When the user slides the member 17 outward through opening 29, the catches 47a and 47b engage the stop 39, stopping further movement after allowing a portion of the member 17 to project out of the housing 13. In this position the user may load a disc on the member or remove a disc previously loaded.

When placed on the member 17, the compact disc rests on surface 49 of section 43 between stop 39 and finger grip 41. This surface 49 lies generally parallel to the base 21 above the catches 47a, 47b, 48a, and 48b. Since the surface lies above the catches, they cannot interfere with the loading and unloading of the compact discs D. Thus, while dividers 15a restrain the disc from moving in the lateral direction, stop 39 and finger grip 41 restrain the disc from moving in the longitudinal direction with respect to member 17.

As stated above, the storage unit 10 is portable and it includes a handle 19 slidably mounted to the housing 13 at the center of the housing and extending vertically from the base 21 to the cover 25. A user may use this handle to conveniently carry the unit with one hand. At its central location, the handle allows the user to balance the unit during transport. The handle 19 (see FIGS. 4 and 5) is a U-shaped member. One of its legs 51 has an elongate opening 53 in which a projection 55 formed in the cover 25 extends and the other leg 57 includes a projection 59 which extends into an elongate opening 61 formed in the base 21 of the housing 13. These connections allow the handle to move between two predetermined locations, as defined by the longitudinal ends of the openings 53 and 61. In the retracted position shown in solid lines in FIG. 5, the handle serves as a divider for the storage unit and a structural support which prevents the cover 25 from buckling when the storage unit supports other units placed on top of it. In the extended position shown in phantom lines in FIG. 5, it serves as a handle which the user may grip to carry the storage unit.

To place a compact disc in a storage unit, the user must first slide the member 17 outward of the chamber, using the finger grip 41, until stop 39 engages projections 47a and 47b. In this first mode, the user can place the compact disc D onto surface 49 because the clearance between cover 25 and surface 49 is sufficient to allow the user to slide the compact disc over and past the finger grip 41 in place and partially within the chamber C. After placing the compact disc D in its seat on member 17, the user may then advance the member 17 into the chamber C, i.e., into a second mode where the housing 13 encloses the disc in chamber C. To remove the compact disc from the storage unit, the user should follow the same procedure in reverse order.

Thus, the applicant has provided an disc storage unit of simple yet effective construction. This construction minimizes the expense of manufacture and it comprises a small number of components which provide effective containment of the compact discs. The storage unit contains the discs securely and separately so that they do not contact each other; and it displays the discs so that the user may readily select which of the discs to remove from the storage unit.

While the applicant has shown only one embodiment of the invention, one will understand, of course, that the invention is not limited to this embodiment since those skilled in the art to which the invention pertains may make modifications or other embodiments of the principles of this invention, particularly upon considering the foregoing teachings. For example, one skilled in the art may modify the storage unit of the present invention to have a housing with an opening at its top and dividers secured to its sidewalls. Therefore, by the appended claims, the applicant intends to cover any such modifications and other embodiments as incorporate those features which constitute the essential features of this invention.

What is claimed is:

1. A portable storage unit for a plurality of plate-like, compact discs used in electronic systems, said unit comprising: an elongate housing having an interior chamber and defining an opening through which said unit receives said discs; means for separately retaining said plurality of discs in substantially vertical, face to face relation within said chamber, said retaining means secured to said housing; independently adjustable means slidably secured to said housing for supporting said discs and for selectively and independently placing each of said discs in said housing and removing each of said discs from said housing, said adjustable means moving between a first mode in which a portion of said adjustable means projects outward through the opening in said housing where the user may place a disc on said adjustable means or remove a disc from said adjustable means and a second mode in which said disc is substantially contained within said chamber; and an adjustable handle for carrying said unit, said handle spanning said opening for supporting the walls of said unit at the opening and maintaining a constant shape for the opening.

2. The compact disc storage unit of claim 1, wherein said means for retaining said discs includes a plurality of divider segments disposed in parallel spaced relation in said chamber, said divider segments providing predetermined parallel paths of movement for said discs and defining seats for said discs in said chamber.

3. The compact disc storage unit of claim 1, wherein said adjustable means includes catch means and plurality of guide members in sliding engagement with said housing, each guide member having stop means to coact with said catch means and limit the movement of said guide members between said first and second modes.

4. The compact disc storage unit of claim 3, wherein said guide members are flat and elongate and include gripping means for the user to grip said members and move them.

5. The compact disc storage unit of claim 3, wherein said catch means includes a portion of said housing and a retaining means segment which projects into the path of said stop means.

6. A portable storage unit for a plurality of plate-like, compact discs used in electronic systems, said unit comprising: an elongate housing having an interior chamber and defining an opening through which said unit receives said discs; a plurality of divider segments disposed in parallel spaced relation in said chamber, said divider segments defining predetermined parallel paths of movement for said discs and retaining said discs in substantially vertical, face to face relation within said chamber; a plurality of adjustable guide members, each disposed in said chamber between the divider segments in sliding engagement with said housing for supporting a disc and for selectively and independently placing a disc in said housing and removing a disc from said housing, said adjustable means moving between a first mode in which a portion of said adjustable means projects through the opening in said housing where the user may place a disc on said adjustable means or remove a disc from said adjustable means and a second mode in which said disc is substantially contained within said chamber; and an adjustable handle for carrying said unit, said handle spanning said opening for supporting the walls of said unit at the opening and for maintaining a constant shape for the opening.

7. The compact disc storage unit of claim 6, wherein said housing includes means for supporting another similar storage unit in juxtaposed registry therewith.

* * * * *